Aug. 9, 1966  E. J. TRUNK  3,265,800
METHOD OF INJECTION MOLDING CROSS-LINKABLE COMPOSITIONS
Filed April 6, 1964
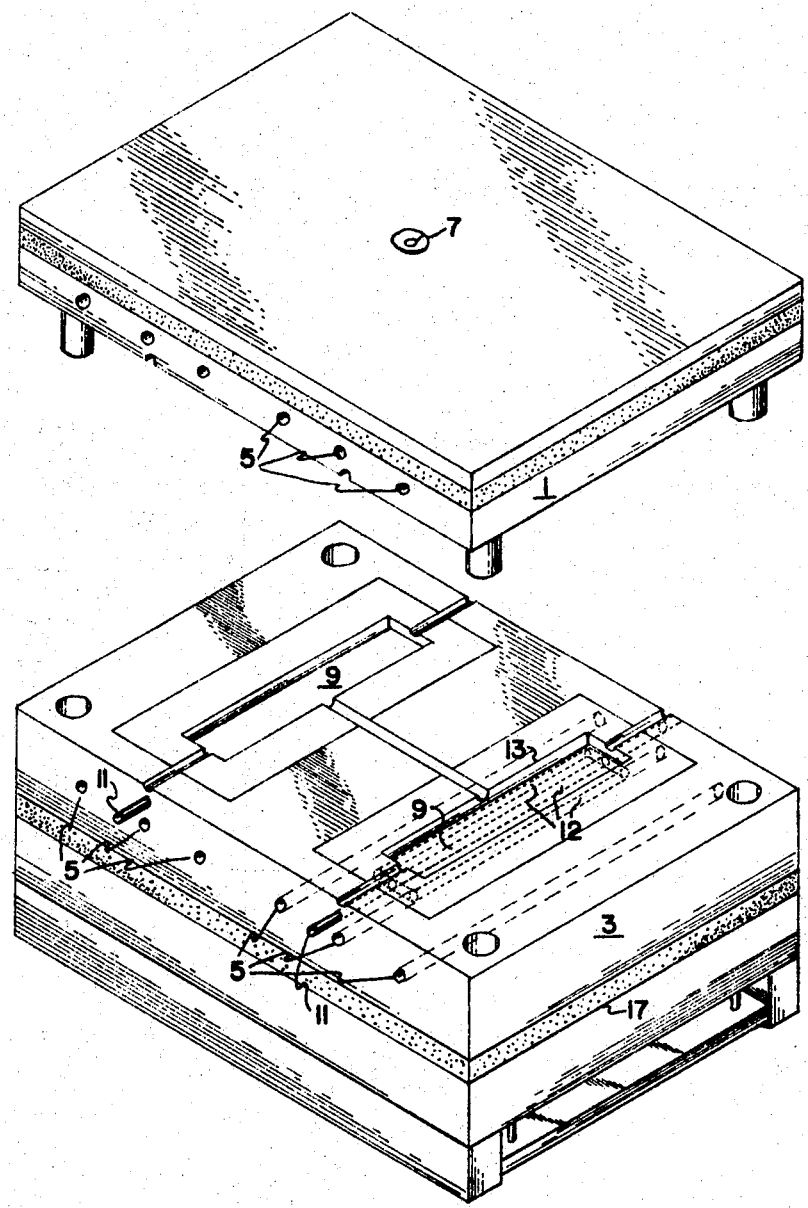
INVENTOR.
EUGENE J. TRUNK text continues …

United States Patent Office 3,265,800
Patented August 9, 1966

3,265,800
METHOD OF INJECTION MOLDING CROSS-LINKABLE COMPOSITIONS
Eugene J. Trunk, Somerville, Mass., assignor to Cabot Corporation, Boston, Mass., a corporation of Delaware
Filed Apr. 6, 1964, Ser. No. 357,690
8 Claims. (Cl. 264—328)

The present invention relates to the molding of polyolefinic compositions and more specifically to an improved process for molding thermally cross-linkable polyolefinic compositions.

It is well known that thermally cross-linkable polyolefinic compositions, such as for example, polyethylene having dispersed therein a filler and a cross-linking agent can be molded and cross-linked to produce finished articles possessing most desirable properties. Heretofore, however, efforts directed toward injection molding and cross-linking said compositions in the mold have not generally met with commercial success due, in large measure, to the relatively long time required to complete a molding cross-linking cycle. Thus, in a typical injection molding cross-linking cycle, a cross-linkable polyolefinic composition comprising high density polyethylene, carbon black and a suitable thermally activatable free radical producing agent, is heated to a temperature above the minimum temperature at which said compositions will flow but below the minimum temperature at which cross-linking will occur in a short period of time, and is injected under pressure into a suitable mold wherein said composition is heated to a temperature at which cross-linking of the composition will occur relatively quickly. When the residence time of said composition in the mold has been sufficient for cross-linking to occur, the resulting formed cross-linked article is ejected from the mold. However, in order that said article can be ejected from the mold without injury thereto or deformation thereto, it is necessary that said article be sufficiently cool to be form stable. Cooling to achieve form stability is generally effected by cooling the mold and its contents to below the hardening temperature of the composition, which cooling generally requires a considerable period of time. Moreover, a repetition of the cycle is delayed because the mold must be reheated necessitating a still further loss of time. As is well known in the injection molding industry, even a few seconds difference in operating cycles can spell the difference between a profitable and nonprofitable operation. Moreover, in the injection molding of a cross-linkable composition, the thermal history of the composition is critical in that said composition is subject to premature cross-linking if maintained for prolonged periods of time at elevated temperatures. Accordingly, due to the relatively slow cycling inherent in prior art processes, a serious danger of premature cross-linking has heretofore been omnipresent. In accordance with the present invention, however, all of these problems have been largely overcome.

It is a principal object of the present invention to provide an improved process for producing molded cross-linked polyolefinic articles.

It is another object of the present invention to provide an improved process for producing cross-linked polyolefinic articles by injection molding techniques.

Other objects of the present invention will in part be obvious and will in part appear hereinafter.

In accordance with the present invention it has been discovered that significantly decreased molding cycle time and other benefits accrue when (a) a cross-linkable polyolefinic composition, heated above its minimum flow temperature but below the temperature at which substantial cross-linking will occur in a reasonable time (i.e. less than about 30 min.), is injected into a mold cavity, (b) the temperature of said composition is then raised to above the minimum cross-linking temperature (i.e. a temperature at which substantially complete cross-linking will occur in less than about 2 min.), (c) the surfaces of the article in the mold are chilled so as to provide a hardened "skin" thereon, and (d) the resulting molded article is then ejected from said mold cavity. Moreover, surprisingly it has been found that after removal from the mold, the molded article, does not, as might have been expected, become distorted on cooling.

A better understanding of the process and apparatus of the present invention and the benefits accruable therefrom can be had when reference is made to the drawing, forming part hereof wherein in FIGURE 1, there is diagrammatically illustrated an apparatus suitable for the practice of the present invention.

In a typical injection molding cycle utilizing the process of the present invention, referring now the drawing, mold blocks 1 and 3 are closed and heated (generally to a temperature substantially above the minimum cross-linking temperature of the particular composition to be utilized) by heating means 5. The molten composition is introduced under pressure through sprue 7 thereby filling mold cavities 9. Due to conductance of heat from mold blocks 9 which act as a heat source, the composition in cavities 9 becomes heated to well above its minimum cross-linking temperature and quickly becomes substantially completely cross-linked. Next, coolant introduced through inlets 11, flows through conduits 12 which are preferably positioned immediately adjacent mold cavity surfaces 13, thereby quickly and preferentially cooling said surfaces and the surfaces of the article in the mold. Cooling is continued until the exterior surfaces of said article are chilled to below the hardening temperature thereof, i.e. until said article has form stability. The mold blocks are then opened and the article is ejected from the mold cavities by any suitable means. The flow of coolant is then arrested as quickly as possible and accordingly surfaces 13 quickly become reheated by conduction thereto of the heat generated by heating means 5 and the relatively large quantity of heat retained in mold blocks 1 and 3. While it is not necessary, it is preferred that heating elements 5 remain operative even during the cooling operation. Moreover, it is recommended that insulating layers 17 be disposed about the mold blocks in order that heat loss therefrom to the associated apparatus be minimized. Said insulation can be asbestos, epoxy resin sheet, fiber glass/polyester resin sheeting or other materials of a similar nature.

The particular coolant utilized in accordance with the present invention is not normally critical although cooling is preferably accomplished by utilizing a liquid which has a high heat capacity and/or a high heat of vaporization. Obviously then, many liquids are suitable coolants. For instance, liquid ammonia, methyl chloride, liquid sulfur dioxide, ethylene glycol, methyl alcohol, isopropyl alcohol, fluorocarbons such as difluoromonochloromethane, and the like are all generally suitable. Water, however, is much preferred as the coolant in that water has a high heat of vaporization, is expendible, is non-toxic and is readily adaptable to injection molding processes.

The amount of coolant required and the rate at which said coolant is supplied to the mold is dependent upon such parameters as the thickness of the molded part, the cross-linking temperature, the particular composition utilized, the materials from which the mold blocks and mold cavities are fabricated, and the like. Said rates of supply can be readily determined in practice.

Thermally cross-linkable polyolefinic compositions suitable for use in the process of the present invention are well known to the art. Said compositions generally comprise substantially saturated polymers or mixtures thereof of α-mono-olefins having dispersed therein a thermally activatable cross-linking agent. Representative polymers of the above-described type are: polyethylene, polypropylene, polybutylene, polypentylene, ethylene-propylene copolymers, ethylene-butylene copolymers, and the like. Polyethylene, however, is preferred.

Any of the thermally activatable free radical producing agents known to the art can in general be utilized. One class of said agents has currently gained extensive popularity, i.e. organic peroxides such as dicumyl peroxide, tertiary butyl perbenzoate, cumene hydroperoxide, benzoyl peroxide, di-t-butyl peroxide, t-butylcumyl peroxide, and the like. Other thermally activatable free radical producing agents are also suitable, however. For instance, free radical producing agents such as m-dinitrosobenzene, poly(p-dinitrosobenzene) and mixtures thereof disclosed in U.S. Patent 3,093,614 are also suitable for use in accordance with the present invention. Also suitable are free radical producing agents such as p. quinone dioxime, dibenzoyl p. quinone dioxime and diacetyl p. quinone dioxime.

Although the present invention encompasses cross-linkable polyolefinic compositions as hereinbefore described, it more especially contemplates compositions comprising in addition to a polymer and a thermally activatable cross-linking agent, a filler. Any of the fillers generally known to the art, such as asbestos, silica, and carbon black are normally suitable. The use of a filler is often beneficial in that it is well known, for instance, that the presence of carbon black often effects a desired improvement in the properties of the resulting cross-linked article.

There follows an illustrative non-limiting example:

*Example 1*

Insulated 10″ x 3″ mild steel mold blocks of the type pictured in FIGURE 1 having beryllium copper alloy mold cavities 9, ⅜″ diameter cooling cores 12 spaced about 0.125 inch beneath mold cavity surfaces 13, and equipped with electric cartridge heating means 5 are heated to about 425° F. Said blocks are then brought together in a screw injection molding apparatus at a clamping pressure of about 300 tons. Next, a cross-linkable relatively homogeneous composition comprising by weight about 100 parts of a high density polyethylene, about 120 parts furnace carbon black, and about 3 parts 2,5-dimethyl-2,5-di(t-butyl-peroxy) hexyne-3 is heated to about 290° F. and is injected into mold cavities 9 under a pressure of about 25,000 p.s.i. through sprue 7. Said composition is then retained within said heated mold block for about 2 minutes. Next, water is flowed through cores 12 for about 5 seconds, electric cartridge heaters 5 being maintained in operation. Immediately thereafter, said mold blocks are opened and the molded cross-linked articles are ejected. Examination of said pieces immediately after ejection reveals that the surfaces thereof are hardened while the internal portions thereof are still soft. Moreover, said pieces normally do not distort or deform upon cooling to room temperature. Immediately after ejection of the molded pieces, the temperature of mold cavity surfaces 13 is determined to be about 250° F. Within about 0.5 minute thereafter, the temperature of surfaces 13 is found to be about 425° F.

Obviously many changes can be made in the above example and description without departing from the scope of the present invention.

For instance, other methods for heating the mold blocks, such as by flowing steam or heated oil through cores provided within the mold blocks are also suitable for the purposes of the present invention.

Furthermore, polyolefinic compositions comprising a polymer other than polyethylene such as polypropylene, polybutene, etc., having dispersed therein a suitable cross-linking agent such as those described heretofore also constitute suitable thermally cross-linkable polyolefinic compositions.

Accordingly, it is intended that the above disclosure be regarded as illustrative and as in no way limiting the scope of the invention.

What I claim is:

1. In a process for injection molding curable polyolefin compositions which comprises injecting into a mold cavity a charge comprising a thermally cross-linkable polyolefinic composition heated to above the minimum flow temperature but below the active cross-linking temperature thereof, the improvement which comprises seriatim:
    (a) injecting said composition into a mold cavity heated to above said active cross-linking temperature,
    (b) maintaining the resulting molded article in said mold cavity until substantially complete cross-linking has occurred,
    (c) rapidly cooling substantially only the exterior surfaces of said article while in said mold cavity to form a form stabilizing skin thereon, thereby rendering said article form stable and distortion resistant, despite the fact that the central mass of said ware remains entirely deformable,
    (d) ejecting said form stable and distortion resistant article from said mold cavity.

2. The process of claim 1 wherein said composition comprises a polyolefin polymer, a filler and a thermally activatable free-radical producing agent.

3. The process of claim 2 wherein said polymer is a polymer of ethylene.

4. The process of claim 2 wherein said filler is carbon black.

5. The process of claim 2 wherein said thermally activatable free-radical producing agent is an organic peroxide.

6. A process for molding and curing a thermally cross-linkable polyolefinic composition to produce a distortion resistant cross-linked article which comprises
    (a) providing said composition heated to above the minimum flow temperature but below the minimum active cross-linking temperature thereof,
    (b) providing a mold comprising a mold block and a mold cavity heated to and maintained at above the minimum active cross-linking temperature of said composition, and seriatim
    (c) injecting said heated composition into said heated mold cavity,
    (d) maintaining the temperature of said mold cavity above said minimum cross-linking temperature until the molded composition therein has become substantially completely cross-linked,
    (e) substantially immediately thereafter flowing a liquid coolant within the interior of said mold substantially adjacent the surfaces of said mold cavity in order to produce only a form-stable skin on said molded cross-linked composition, and
    (f) ejecting said form-stable and distortion resistant molded composition from said mold cavity.

7. The process of claim 6 wherein the heating of said mold block is continued while said liquid coolant is flowed adjacent the surfaces of said mold cavity.

8. The process of claim 6 wherein said liquid coolant is water.

References Cited by the Examiner

UNITED STATES PATENTS

| | | | |
|---|---|---|---|
| 2,528,523 | 11/1950 | Kent. | |
| 2,628,214 | 2/1953 | Pinkey. | |
| 2,738,551 | 3/1956 | Howald | 264—328 |
| 2,781,547 | 2/1957 | Moxness | 264—328 |
| 2,826,570 | 3/1958 | Ivett | 260—41 |
| 2,938,232 | 5/1960 | Martin | 18—30 |
| 2,972,780 | 2/1961 | Boonstra | 264—329 X |
| 3,092,440 | 6/1963 | Rex | 264—328 |
| 3,122,598 | 2/1964 | Berger | 264—328 X |
| 3,141,197 | 7/1964 | Hahn | 18—30 |

ROBERT F. WHITE, *Primary Examiner.*

R. B. MOFFITT, *Assistant Examiner.*